United States Patent [19]

Kelm

[11] 4,148,006
[45] Apr. 3, 1979

[54] SEISMIC CABLE FOR USE WITH ARRAY TERMINAL TYPE ACQUISITION SYSTEMS

[75] Inventor: Edward C. Kelm, Pasadena, Calif.

[73] Assignee: Geophysical Systems Corp., Pasadena, Calif.

[21] Appl. No.: 834,817

[22] Filed: Sep. 19, 1977

[51] Int. Cl.² .............................................. G01V 1/16
[52] U.S. Cl. ............................ 340/15.5 TS; 174/70 R
[58] Field of Search ............... 340/15.5 TS, 15.5 MC, 340/15.5 CP, 150, 151; 174/70 R; 346/33 C

[56] References Cited

U.S. PATENT DOCUMENTS

| 3,938,073 | 2/1976 | Fort et al. | 340/15.5 TS |
|---|---|---|---|
| 3,986,162 | 10/1976 | Cholrz et al. | 340/15.5 TS |
| 4,001,769 | 1/1977 | Fort et al. | 340/15.5 TS |
| 4,041,444 | 8/1977 | Carter | 340/15.5 TS |
| 4,041,445 | 8/1977 | Carter | 340/15.5 TS |

Primary Examiner—Nelson Moskowitz

Attorney, Agent, or Firm—Daniel Silverman

[57] ABSTRACT

A simplified cable system for use in gathering S analog signals into each of T array terminals (AT), spaced apart a distance D, where the analog signals are amplified, digitized, stored and, on command, transmitted as trains of digital bits along a digital conductor pair in the cable system, to successive ATs downline, to a recording unit. In the optimum embodiment, the cables are all identical, are plugged into each of 2 ports, or receptacles, in each AT. The cables are D/2 long, have S/2 conductor pairs, and S/2 takeouts spaced D/S apart, each takeout connected to a different conductor pair. Each cable contains at least one digital conductor pair. Two cables in series connect between adjacent ATs. The plugs joining one cable to the next, connect only the digital conductor through from cable to cable, while the analog conductor pairs are dead ended at the joining plugs.

5 Claims, 7 Drawing Figures

SEISMIC CABLE FOR USE WITH ARRAY TERMINAL TYPE ACQUISITION SYSTEMS

REFERENCE TO RELATED PATENT

This application is related to U.S. Pat. No. 3,881,166, issued Apr. 29, 1975, in the names of J. R. Fort et al, for Data Array Network System.

BACKGROUND OF THE INVENTION

The invention lies in the field of seismic prospecting methods and apparatus. More particularly it concerns seismic apparatus employing very large numbers of separate recording channels, in which groups of S recording channels are collected into each of T array terminals (AT) spaced apart a distance D, where the geophone signals are amplified, digitized, and transmitted as trains of digital bits to the next AT.

Still more particularly, it concerns the design of a cable system that includes at least one digital conductor pair, and a plurality of S/2 analog conductor pairs, fabricated into a plurality of identical cables D/2 in length, that can be connected to each other and to the array terminals. The cables are interchangeable end for end.

In the prior art, in seismic operations over the past 40 years, geophones on the ground have been connected to a recording unit by means of multi-conductor cables. Individual twisted pair conductors were connected from each geophone, to separate amplifiers in the recording unit. The number of conductor pairs in the cable always equalled the number S of geophone groups.

With very large numbers of channels, and very long cables, the cable system was sometimes made up of separate paralleled cables, so that the cables could be tapered in length. For example, there might be 4 separate cables, each with N/4 conductor pairs. One cable would be ¼ of the total length (L/4) of the cable spread, and would handle the N/4 geophones closest to the recording unit. Another cable of length L/2 would handle the next N/4 geophones. Another cable 3L/4 long would handle the third group of N/4 geophones, and the fourth cable of length L would handle the last N/4 geophones.

In recent years, the seismic practice has come to use cables of many conductor pairs, made in short lengths, and connected to plugs at each end, so that the cables were identical, end for end. This required that the conductor pair connections would be the same at each plug. Thus, the economy of tapered cables could not be utilized, and the total number of conductor pairs needed is equal to N.

More recently (as described in U.S. Pat. No. 3,881,166) a system with a very large number of channels has been provided in which the total number of TS geophones are divided into T groups of S each. Each group of S geophones are connected by a cable with S conductor pairs into each of the T ATs, where the analog geophone signals are digitized, stored, and transmitted as trains of digital signals on a digital conductor pair to the next AT and so on.

Here again, the cables are broken into units of length D equal to the spacing between pairs of ATs. Each cable has takeouts to connect S geophones, D/S apart. Each cable can be turned end for end without effect. Each cable has S analog conductor pairs.

SUMMARY OF THE INVENTION

It is a primary object of this invention to provide a conductor cable system for use with array terminals which utilize multi-conductor cables, which can be interchanged end for end, which provide takeouts for S geophones spaced D/S apart between ATs and which require only S/2 analog conductor pairs in the cable.

It is a further object to provide a cable system in which the average length of the analog conductors from the geophones to the array terminal is one half of the normal average length.

It is still further object of this invention to provide a cable system in which two cables are connected respectively to 2 ports in an array terminal and the receptacles in the 2 ports are identical.

These and other objects and advantages are realized and the limitations of the prior art are overcome in this invention by providing a cable of length D, to be connected between two adjacent ATs. There are S/2 conductor pairs from each end plug, to the middle of the cable, where the conductors are cut apart. There are S/2 takeouts spaced D/S apart on each half of the cable, one connected to each conductor pair. The two halves of the cable are mirror images of each other.

Each AT has 2 ports, or receptacles, into which the plugs on the ends of the cables can be plugged. Thus, each At receives S/2 geophone signals, over S/2 conductor pairs into each port, one cable extending downline toward HT next At nearer to the recording unit, and the other cable extending upline to the next AT farther from the recording unit.

In addition to the S/2 analog conductor pairs for the geophone signals, there are in the cables at least one digital conductor pair, which will preferably be a coaxial cable, for example.

Since the S/2 analog conductor pairs are cut at the midpoints of the cables, the entire cable can be cut, and plugs attached similar to those on the ends of the original cable.

Thus, instead of one cable with 2 plugs of length D, there are now two cables, each with a plug on each end, of length D/2. All plug connections are alike, and the cables can be inverted end for end, without any effect on the connections. When two plugs are connected to each other, only the digital conductor pair is connected through, the analog conductors being dead ended. When a plug is inserted into a receptacle at an AT all the conductors in the cable are connected into the AT.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
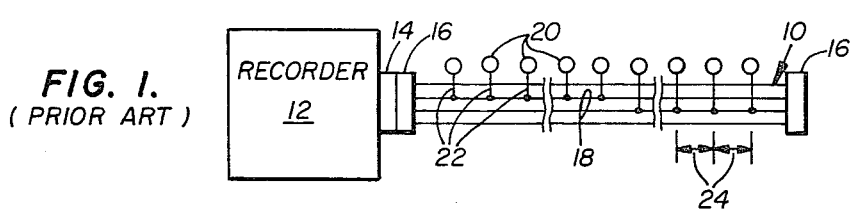
FIGS. 1, 2, and 3 illustrate prior art cable configurations for conventional 24, 48 channel systems, and for the newer 256 to 1024 channel systems.
Figure 2:
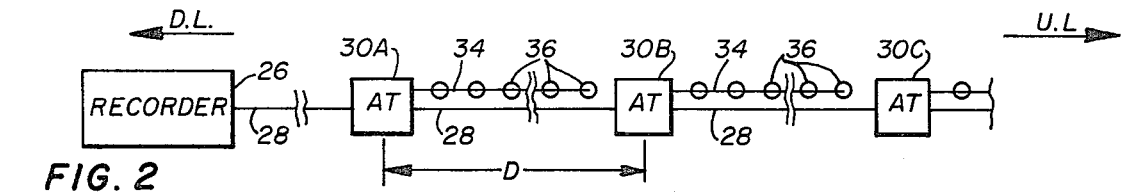
Figure 3:
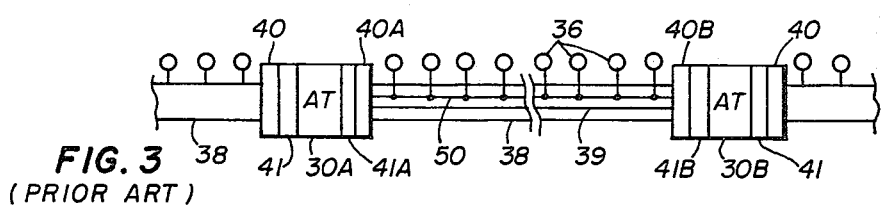

Referring now to the drawings, there are shown in FIGS. 1, 2, and 3 prior art cable systems. FIG. 1 illustrates the cables for a conventional seismic system with say 24 to 48 channels. A recording unit 12 has a receptacle 14 into which a cable 10 is plugged by means of identical plug 16, one on each end. There are a plurality of conductor pairs 18 which are intact from one plug to the other. Takeouts 22 are connected to individual conductor pairs at spaced intervals 24, which are connected to geophones 20. While there may be groups of geophones connected to each takeout, or only one geophone, they will be called a geophone.

While this system is particularly well adapted for use in seismic operations, it can be used to gather, process, and transport analog signals from any type of source. The description of the system in terms of seismic data gathering operations is purely for purpose of illustration.

The spacing of takeouts in uniform, end to end. The connections from each conductor to the terminals of the plug is such that, whether the plug at one end or the other of the cable is connected to the recorder 12, the internal circuits will be connected to the geophones at the same positions. Since the cables are identical end for end, the conductors must be continuous throughout the full length. There are as many conductor pairs in the cable as there are geophones.

In general, the cable 10 of FIG. 1 will be a long cable up to lengths of 5 to 10 miles in length, and will have many conductors, as many as 200 pair or more.

FIG. 2 illustrates a prior art cable system which has been copied from FIG. 1 of U.S. Pat. No. 3,881,160. It is concerned with new seismic system that employs from 256 to 1024 separate recording channels. A recorder 26 is connected by at least one digital conductor cable 28 to a first array terminal 30, which is connected to a second AT, etc. Into each AT 30 is connected a multiconductor cable 34 having a plurality of S geophone takeouts spaced D/S apart, where D is the spacing between ATs.

The convention of "downline" in accordance with arrow DL will signify the direction toward the recording unit. The expression "upline" will indicate the direction away from the recording unit.

While this invention is closely concerned with the type of seismic system described in U.S. Pat. No. 3,881,166 and illustrated in FIG. 2, the particular signal handling apparatus inside the ATs 30 and the recording unit 36 are prior art. Since they are fully described in the patent, they will not be described further.

In the prior art represented by U.S. Pat. No. 3,881,166 and indicated in FIG. 2, all S geophones in the space D are connected by the same cable over S conductor pairs and go to one AT.

FIG. 3 shows further detail of the cable 38, which incorporates the circuit of FIG. 2. This cable 38 has S analog conductor pairs carrying geophone signals. These are preferably twisted pairs 50. There is at least one pair of conductors 39 for transmission of digital signals, such as a coaxial cable, for example. All of the S conductor pairs would be connected through plug 40A into the downline AT30A. Normally the second plug 40B would have its terminals connected to those of plug 40A. It is clear, therefore, that the terminals in receptacle 41B would have to be differently coded than the receptacles 40A. In other words, there would be "upline" receptacles and "downline" receptacles. Failure to observe which receptacle the plugs are connected to could affect the internal connections.

Figure 4:
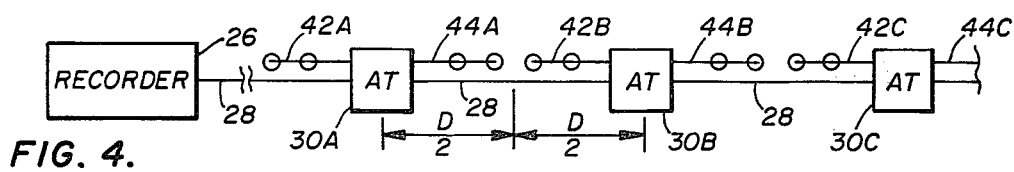
FIG. 4 illustrates schematically one embodiment of this invention.

FIG. 4 is a schematic diagram, similar to that of FIG. 2, providing the same ATs and cables, and spacings as FIG. 2, but requiring only half as many analog conductor pairs as FIG. 2. The recorder 26 is connected to at least one digital conductor pair 28 to the first AT 30A, which is connected to the second AT 30B, and so on. A multi-conductor cable 42, 44, having S/2 conductor pairs connected into each of two identical ports in each AT. These conductors extend for distance D/2 and have S/2 takeouts, one for each conductor pair.

It is clear, of course, that together the two cables 42A and 44A connected to AT30A deliver signals from S geophones, each spaced apart D/S and each carried by independent conductor pairs.

It will be clear also that the two cables 44A and 42B can be a continuous cable, but with the conductors cut inside of the jacket at the midpoint. Also, the jacket can include the S/2 analog conductor pairs plus at least one digital conductor pair 28, which would be continuous from one end to the other.

Figure 5:
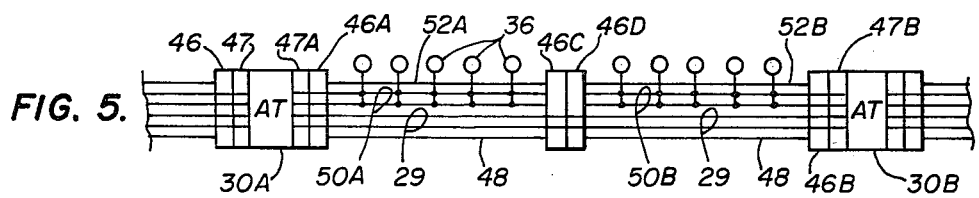
FIG. 5 illustrates the cable construction of the system of FIG. 4.

The system of FIG. 4 is illustrated in greater detail in FIG. 5. Here the cable jacket 48 includes S/2 conductor pairs 50 plus at least 1 digital conductor pair 29. The digital conductor pair is continuous from plug 46A to plug 46B. S/2 conductor pairs connect to plug 46A and have S/2 takeouts D/S apart. The conductors 50A extend to the center of the cable 48. Similarly the conductors 50B extend from plug 46B downline a distance D/2, providing S/2 conductor pairs to S/2 takeouts, to S/2 geophones. The coding of plugs 46A and 46B are identical with respect to the takeouts spaced from the plugs. Thus the cable 48 with plugs 46A and 46B can be interchanged end for end, with identical connections to geophones at selected positions.

It will be clear that the cable 48 can be cut into two pieces at its midpoint, with the ends connected to plugs 46C and 46D respectively. Now there are two identical short cables 52A, 52B. Cable 52A has two plugs 46A, 46C which are identically coded with respect to the takeouts, and the same for cable 52B, which has two plugs 46D and 46B. One cable can be interchanged with the other, and can be reversed without effect on the circuits.

Since the S/2 analog conductor pairs are discontinuous at the midpoint of the cable 48, the plugs 46C and 46D must be coded so that when meshed they do not connect the analog conductor pairs in the two cables. The plugs 46C, 46D connect only the digital conductor pair between the two cables. However, the same plugs (all plugs 46A, 46B, 46C, and 46D) when connected to the receptacles in the ATs must connect all conductors to the terminals in the receptacles.

Figure 6:
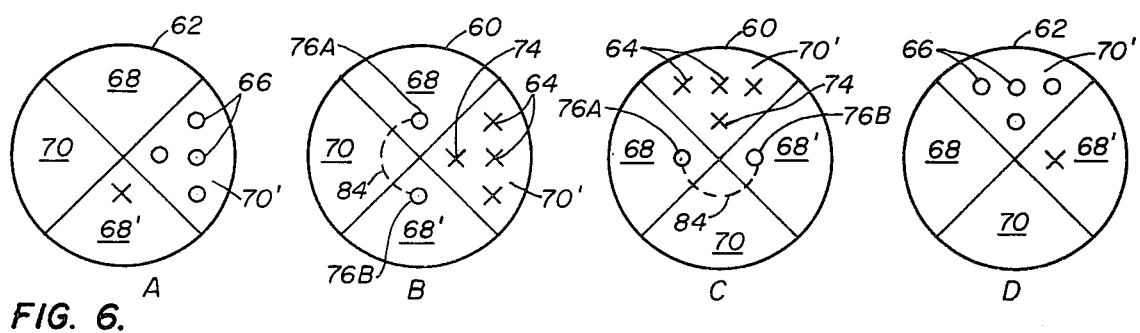
FIG. 6 illustrates the coding of the plugs of the cables.

This can be done in a number of ways, one of which is shown in FIG. 6. This is a schematic diagram of the contacting terminals in the receptacles, FIG. 6A, FIG. 6D, and in the plugs FIG. 6B and FIG. 6C. The male terminals are indicated by crosses and the two female terminals by circles. The plugs are connected to each other, or to a terminal, by setting one figure over the other figure. For example, when A is placed over B, the male terminals, or contacts, 64 in sector 70' in B are meshed with the female terminals 66 in sector 70' in A. Also, the single male terminals in sector 68' in A meshes with the female terminal 76B in B. Thus all terminals in plug and receptacle are connected. In a similar way, the terminals in plug C connect with appropriate terminals in receptacle D.

Now consider the plugs B and C. These are identical plugs, but hermaphroditic. In other words, male and female terminals are provided in each plug. Male terminals are placed in opposite sectors or quadrants 70, 70', while female terminals are positioned in opposite quadrants 68, 68'. When the two plugs are meshed, or connected together, they are meshed with 90° relative rotation so that male terminals mesh with female terminals. Since the analog S/2 conductor pairs all go to male terminals, there is no connection between them, while the male terminal 74 in C meshes with the female terminal 76A in B, and the female terminal 76B in C (or terminal 76A, which is internally connected to 76 by internal connection 84) meshes with the male terminal 74 in B. Thus the two digital conductors are always connected through, while the analog conductor pairs are open circuited.

Figure 7:
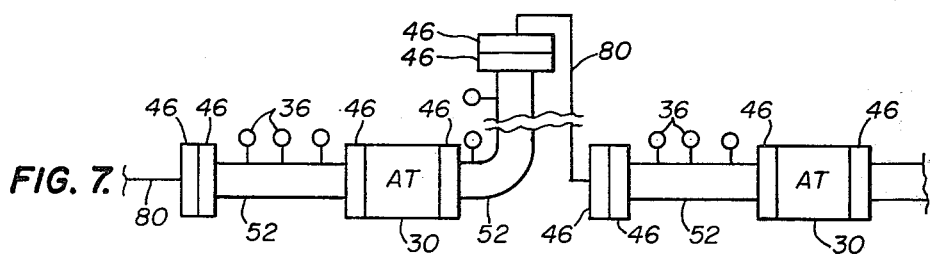
FIG. 7 illustrates an inline and crossline geophone spread using the cables of FIG. 5.

Referring now to FIG. 7, which illustrates the use of short cables 52 shown in FIG. 5, with the addition of jumper cables 80, which have similar plugs 46 to those of the cables 52, but have only the digital jumper pair without the analog conductors. By the use of the jumper cables, combinations of inline and crossline spreads of geophones, as in FIG. 7 can be used, as well as the various spreads shown in FIGS. 2 and 3 of U.S. Pat. No. 3,881,166, and others as well.

What has been described is a plug, cable and takeout system for connecting the geophones, in which the cables are short, are all identical, and can be used in any position with either end connected.

The cable system is designed for a data gathering system in which a plurality of identical ATs are used, spaced apart a distance D with at least two digital conductors connected directly between each pair of ATs. There are S2 analog conductor pairs in each cable connected to S/2 takeouts spaced D/S apart.

These conductors terminate at the midpoint of the cables. S conductor pairs enter each AT, S/2 from each of the cables, one directed downline, the other upline, and are connected to apparatus in the AT, to amplify the geophone signals, digitize them, store the digital values, and on command send them as trains of digital bits downline, on the digital conductor pair, to the next AT and thence to the recording means. The digitizing can be to any desired number of bits, from 1 to N.

While the system is ideal for seismic operations and geophone signals, it can be used for gathering any type of analog signals for amplification, digitization and transport to a recording means.

Also, the cable system of the invention can comprise cables of length D with one end connected to a first AT, and the other end in an adjacent AT. Or, the long cable can be cut into two cables of length D/2, which are identical and can be connected at either end.

While the system shown in FIG. 5 is particularly adapted to a long inline geophone spread, such as that shown in FIG. 1, and to ATs that have two identical ports or receptacles, they can equally well be adapted to crossline spreads such as those indicated in FIGS. 2, 3 of U.S. Pat. No. 3,188,166. Of course, this does not limit in any way the number of ports that may be used in an AT.

Also, it can be used in conjunction with cable jumpers 80 which have identical plugs 46, but have only two digital conductors. These simple jumpers permit a wide variety of two-dimensional arrays of geophones.

This cable system not only provides all conductors necessary to gather signals from S sources, with a saving of substantially one-half of the S conductor pairs normally used to gather from S sources, with a consequent savings in cost and weight of cable, and saving in field operating time.

Also, because the average length of conductors to all the signal sources is one-half of that in the conventional system, there is a consequent reduction in noise pickup in the conductors, with a resultant improvement in S/N ratio.

While the invention has been described with a certain degree of particularity, it is manifest that many changes may be made in the details of construction and the arrangement of components. It is understood that the invention is not to be limited to the specific language used or the specific embodiment set forth herein by way of exemplifying the invention, but the invention is to be limited only by the scope of the attached claim or claims, including the full range of equivalency to which each element or step thereof is entitled.

What is claimed is:

1. In a seismic data gathering system in which a plurality of S geophones are connected by analog conductor pairs into each of a plurality of T array terminals (AT), providing a total of TS geophones, the ATs are spaced along a line a distance D apart, and the S geophones for each of the T ATs are spaced uniformly along the line of ATs at distances D/S apart, and in the ATs the S pairs of analog conductors carry S geophone signals which are amplified, digitized, the digital bits are stored, and on command, are read out of storage as a train of digital bits over a digital conductor pair to and through the next downline AT and to a recording unit; the improvement in cable system comprising;

(a) a first AT, and a second spaced-apart AT next downline toward a recording unit, and a third spaced-apart AT next upline toward the end of the line farthest from said recording unit, each of said ATs having two identical ports and identical receptacles in each port;

(b) a first cable connected to a first port in said first AT and connected to a first port in said second AT; and a second identical cable connected to the second port in said first AT and connected to a first port in said third AT;

(c) said first cable containing at least one digital conductor pair and S/2 analog conductor pairs connected to said first port in said first AT and connected respectively to S/2 geophones positioned D/S apart downline toward said second AT, and spaced substantially a total distance D/2 downline from said first AT;

(d) said second cable, containing at least one digital conductor pair and S/2 analog conductor pairs connected to said second port in said first AT, and connected respectively to S/2 geophones positioned upline D/S apart toward said third AT, and spaced substantially a total distance of D/2 upline from said first AT;

whereby the minimum number of analog conductor pairs entering each port is S/2, one group of S/2 conductor pairs extending D/2 downline, and a second group of S/2 conductor pairs extending D/2 upline from said first AT;

(e) said first and second cables are identical and can be turned end for end, and each comprises a bundle of at least one digital conductor pair, plus S/2 analog conductor pairs, said S/2 analog conductor pairs being cut at the midpoints of said cables while said at least one digital conductor pair is continuous from one end of said cable to the other;

whereby the S spaced geophones positioned between each pair of ATs, are connected half into each of the two adjacent ATs, and said at least one digital conductor pair is connected continuously between adjacent ATs.

2. The cable system as in claim 1 in which each cable is cut at said midpoint forming half cables and the conductors at both ends of each half cable are connected to identical plugs, the plug terminals are coded so that when the plugs are meshed with each other, only the two digital conductors of the cable are connected; and including receptacles in each of said ports, to mesh with said plugs, the receptacle terminals being coded to mesh with all active terminals in said plugs;

whereby when a plug is meshed with another plug, only the digital conductor pair is connected through, whereas when a plug meshes with a receptacle in an AT all conductor pairs are connected.

3. The cable system as in claim 2 in which each half cable and plugs are identical and either end of said half cables can be connected to an AT receptacle, the other end being connected to a plug of another half cable.

4. The cable system as in claim 2 in which said plugs are hermaphroditic, and each of said S/2 analog conductor pairs are connected only to male terminals; whereby when two of said plugs are connected together, no contact is made between the male terminals in the two plugs; and at the receptacles, in the ATs, the internal circuits are connected to the female terminals, whereby when a plug is meshed with a terminal, the S/2 conductor pairs of said cable are connected to the internal circuitry of the AT.

5. The cable system as in claim 2 in which said plugs are hermaphroditic, and each of said S/2 analog conductor pairs are connected only to female terminals; whereby when two of said plugs are connected together, no contact is made between the female terminals in the two plugs; and the receptacles in the ATs, the internal circuits are connected to the male terminals, whereby when a plug is meshed with a terminal, the S/2 conductor pairs of said cable are connected to the internal circuitry of the AT.

* * * * *